Jan. 28, 1941.     C. BRAMMING     2,229,718
WINDSHIELD WIPER
Filed Oct. 28, 1935     3 Sheets-Sheet 2
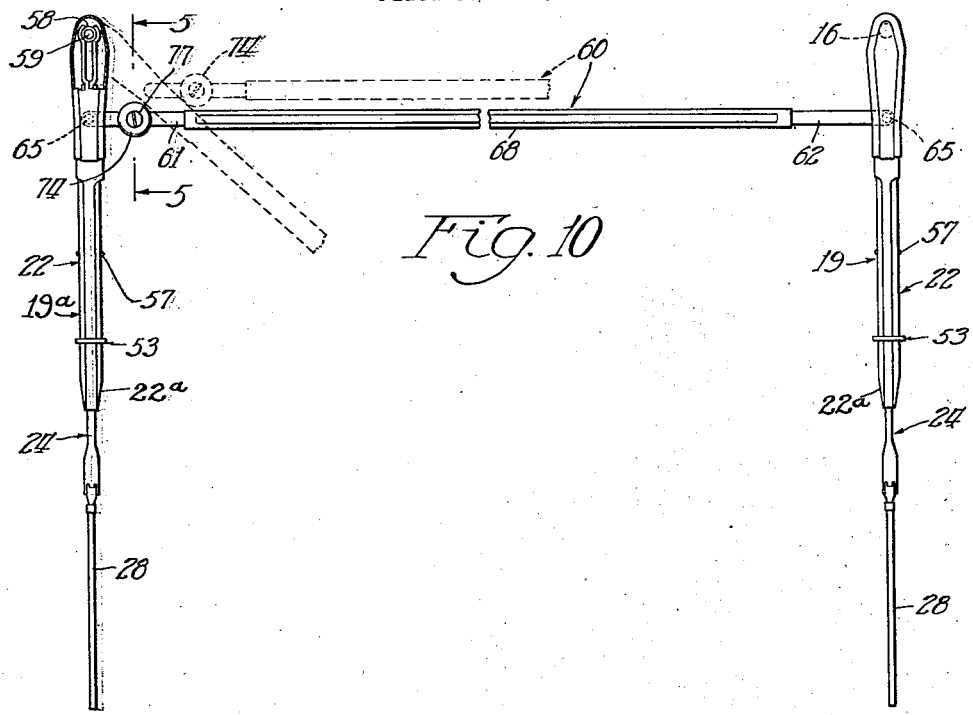
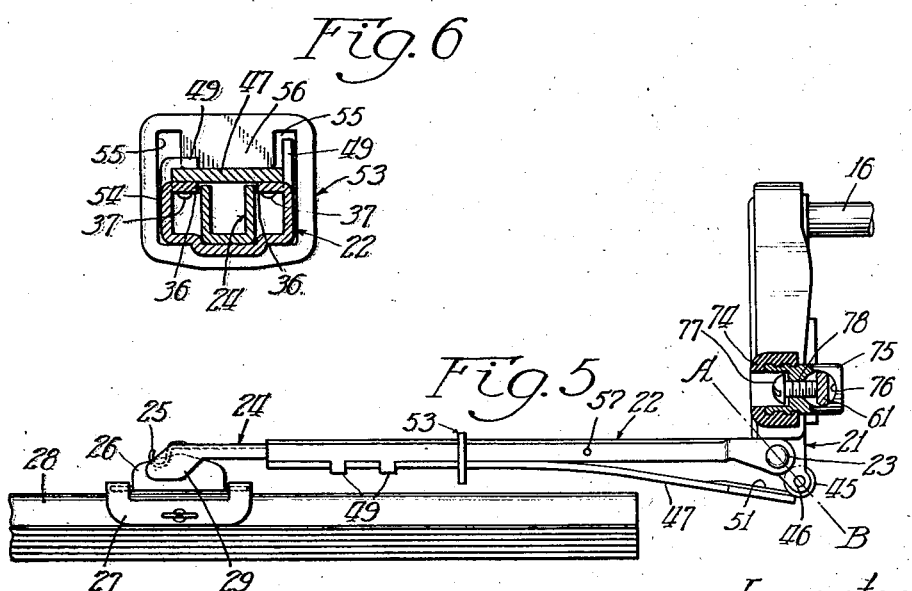
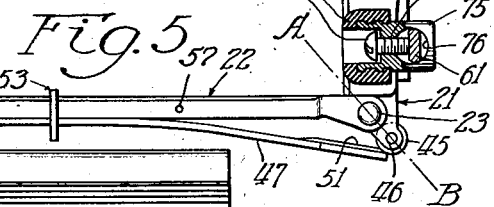
Inventor:
Carl Bramming.
By: Hill & Hill
Witness:
V. Siljander Jan. 28, 1941.  C. BRAMMING  2,229,718
WINDSHIELD WIPER
Filed Oct. 28, 1935  3 Sheets-Sheet 3
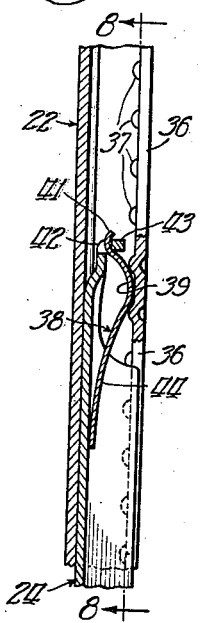
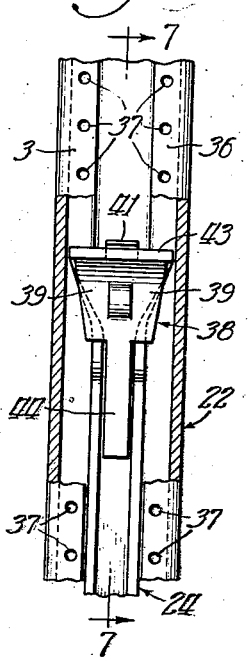
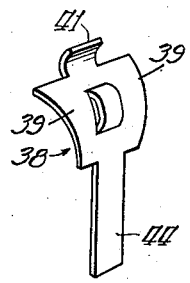
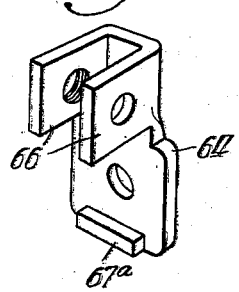
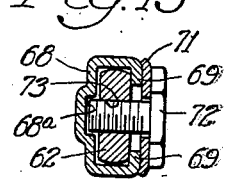
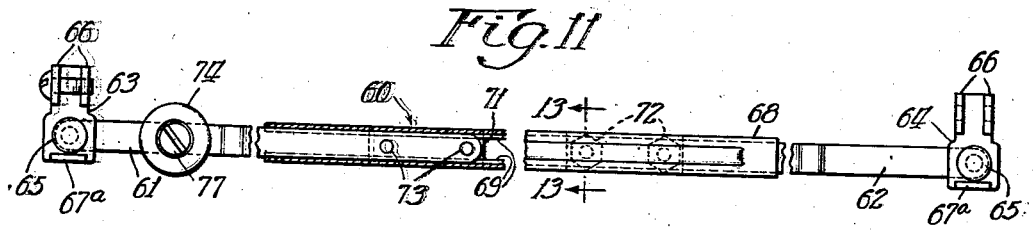
Inventor:
Carl Bramming
By: Hill & Hill Patented Jan. 28, 1941

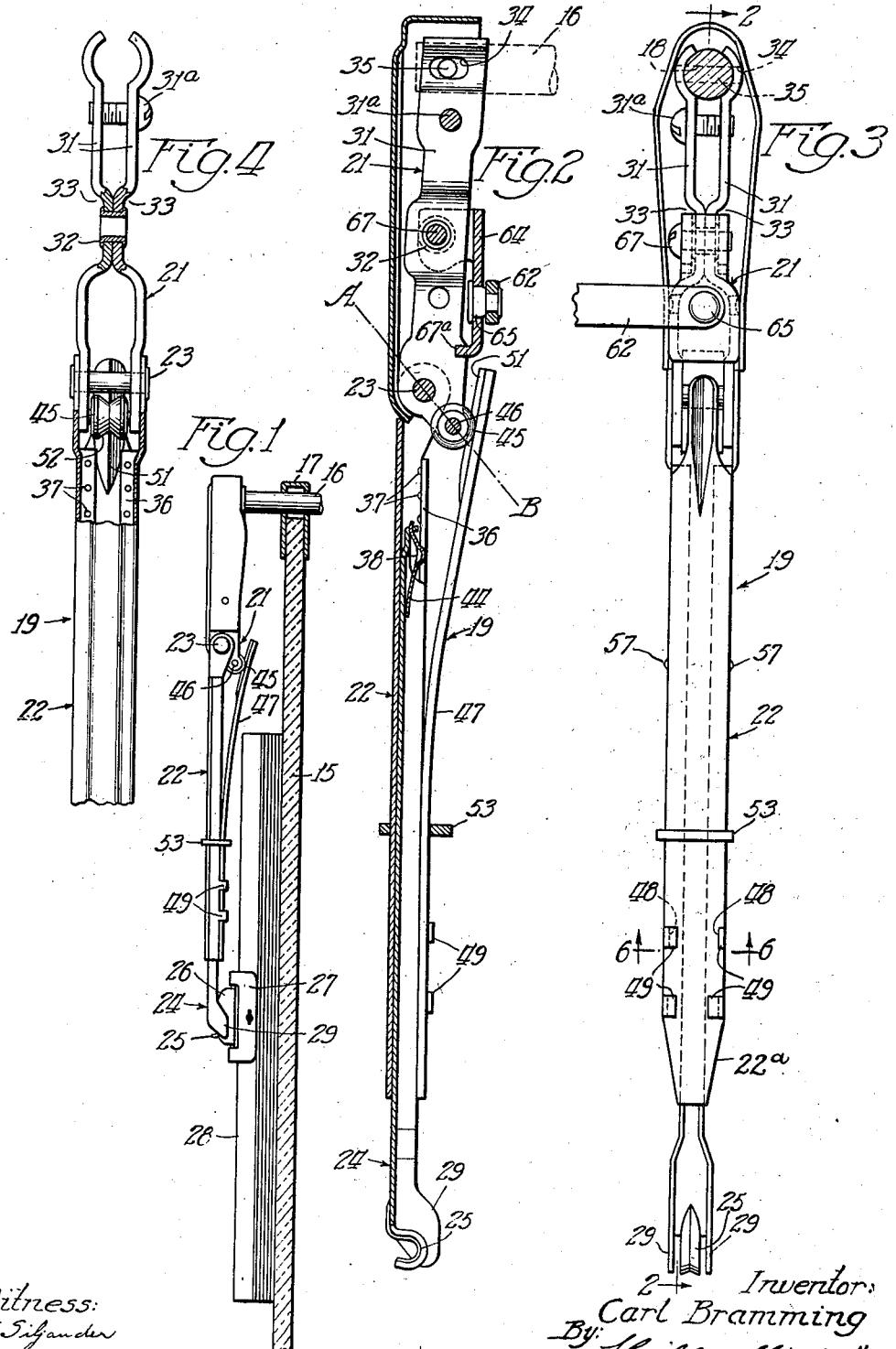

2,229,718

UNITED STATES PATENT OFFICE 2,229,718

WINDSHIELD WIPER

Carl Bramming, Gary, Ind., assignor, by mesne assignments, to Productive Inventions, Inc., Gary, Ind., a corporation of Indiana Application October 28, 1935, Serial No. 47,116

2 Claims. (Cl. 15—255)

This invention relates to windshield wipers, and particularly to the arm thereof by which the wiping element is supported and operatively connected to an actuating member, such as a shaft or other suitable device.

One object of the present invention is to provide a sectional wiper arm which may be readily adjusted to various lengths for positioning the wiping element at various distances from the actuating member, and to provide simple and efficient means for yieldingly maintaining the respective sections of the arm in various positions of adjustments.

Another object of the invention is to provide a wiper arm having resilient means associated therewith for urging the arm and wiping element toward the windshield, and wherein a novel construction and arrangement is provided for the tensioning of said resilient means and for assembling the tensioning means in relation to said arm.

Another object of the invention is to provide a wiper arm strong enough to carry loads encountered in service without breakage of the arm adjacent the shaft or to the actuating member.

Another object of the invention is to provide a wiper arm which, together with the wiping element, may be swung or moved outwardly away from the windshield and yieldingly retained in said upper position, thereby providing free and unobstructed access to the windshield for washing or other manual cleaning.

Another object of the invention is to provide a novel construction and arrangement whereby certain of the arm sections are yieldingly maintained in various positions of relative longitudinal adjustment with respect to each other.

Another object of the invention is to provide a wiper arm which may be readily applied to and disconnected from its actuating member, and wherein the means for varying the tension of certain resilient means associated with the arm may be conveniently and readily adjusted to vary the pressure of the wiping element on the windshield.

Another object of the invention is to provide means for maintaining certain cooperating portions of the device in proper alignment for efficient operation.

Another object of the invention is to provide a novel construction and arrangement whereby a pair of arms of improved construction may be readily connected together to operate in unison.

Another object of the invention is to provide a novel arrangement for adjusting the arm connecting means to permit of mounting a pair of arms at relatively different distances from each other.

A further object of the invention is to provide means for controlling or determining the movement or throw of the wiper arms in their operation.

A still further object of the invention is to improve devices of the character described in sundry details hereinafter referred to and particularly pointed out in the appended claims.

One embodiment of the present invention is shown for illustrative purposes in the accompanying drawings, in which:

Fig. 1 is a side view of my improved wiper arm illustrating its application to a wiping element and actuating member operatively related to a windshield;

Fig. 2 is an enlarged sectional elevation of the improved arm shown in Fig. 1, and taken substantially as indicated by the line 2—2 of Fig. 3;

Fig. 3 is a rear elevational view of the structure shown in Figs. 1 and 2, taken as viewed from the right side thereof;

Fig. 4 is a front view, partly in section, of the improved arm as viewed from the left side of Fig. 1, a cover member shown in Fig. 1 having been removed;

Fig. 5 is a side view of the improved wiper arm illustrating the manner of yieldingly maintaining a portion of the arm and wiping element in raised position away from the windshield to facilitate washing or manual cleaning thereof;

Fig. 6 is an enlarged transverse sectional view taken substantially as indicated by the line 6—6 of Fig. 3;

Fig. 7 is an enlarged longitudinal sectional elevational view of the structure for retaining portions of the device in relative longitudinal adjustment with respect to each other, and taken substantially as indicated by the lines 7—7 of Fig. 8;

Fig. 8 is a side elevational view, partly in section, of the structure illustrated in Fig. 7 as viewed from the right side thereof;

Fig. 9 is a perspective view of a portion of the structure illustrated in Figs. 7 and 8;

Fig. 10 is a front elevational view illustrating the manner of adjustably connecting a pair of arms to operate in unison;

Fig. 11 is an enlarged front elevational view of the connecting means illustrated in Fig. 10 having portions thereof broken away to more clearly illustrate certain of the associated elements;

Fig. 12 is an enlarged perspective view of one of the clips or brackets employed in securing the connecting means to the respective arms; and Fig. 13 is an enlarged transverse sectional elevational view taken as indicated by the line 13—13 of Fig. 11.

In the drawings, 15 designates a windshield having a wiper arm actuating member 16 shown, in the present instance, as a shaft rotatably mounted in a frame 17 of the windshield, and provided, in the present instance, with a transversely extending aperture or recess 18 formed therein, preferably, adjacent the outer end thereof.

My improved wiper arm, indicated as a whole by the numeral 19, comprises an inner section 21, an intermediate section 22 pivotally connected to the inner section as by a pin 23, and an outer section 24, preferably, of channel formation in cross section and slidably mounted with respect to the intermediate section through a tapered guide portion 22a thereof, the outer section 24 having its extreme outer or lower end portion provided with a hook 25 adapted to engage a connector 26 upon which is mounted a clip 27 adapted to receive a windshield wiper element or blade 28 positioned and adapted for engagement with the surface of the windshield 15, the sides of the channel adjacent the hook 25 being extended and spaced from the hook, as indicated at 29, for receiving the sides of the connector 26 between the channel sides 29 and the hook 25.

The inner section 21 comprises, preferably, a pair of oppositely disposed side portions 31 connected together adjacent their central portion by a hollow rivet 32 and having outwardly faced recesses 33 formed therein at opposite sides thereof adjacent the rivet 32, the upper ends of the side portions 31 being spaced to receive the actuating member 16 and provided with apertures 34 adapted to receive a pin 35 extending through the aperture 18 of the actuating member 16 for securing the arm and actuating member together, a clamping screw 31a being employed for clamping the upper ends of the side portions 31 against the sides of the actuating member 16.

Pivotally mounted on the pin 23 in a manner to swing in a plane substantially perpendicular to the wind-shield is the intermediate arm section 22 comprising a transversely elongated U-shaped structure, best illustrated in Fig. 6, and having inwardly extending edge portions 36 provided on their inner faces with protuberances 37 adapted to be engaged by a resilient detent, indicated as a whole by the numeral 38 (Figs. 2 and 9), mounted on the inner end portion of the outer section 24, the said detent being formed of resilient material and provided with laterally extending curved wing portions 39 adapted to be positioned between the protuberances 37, and having a projection 41 positioned in an aperture 42 formed in the laterally bent portion 43 formed at the extreme inner end of the section 24, the detent 38 being provided also with a leg portion 44 adapted to be positioned between the legs of the channel forming the section 24 in a manner to retain the detent in proper alignment therewith for efficient engagement of the portions 39 with the protuberances 37 formed on the inner face of the inwardly extending edge portions 36 of the intermediate section 22.

It will be apparent from the foregoing description that the outer section 24 may be moved longitudinally in either direction within the U-shaped portion of the intermediate section 22 in a manner to adjustably vary the length of the arm 19 to position the wiper blade at various distances from the actuating member 16, the detent 38 being yieldable during such movement to permit the portions 39 to pass over the protuberances 37 and to be positioned between the protuberances, as clearly illustrated in Fig. 7, to yieldingly secure the outer section 24 in adjusted position with respect to the intermediate section 22.

For urging the intermediate section 22, outer section 24 and wiper blade 28 toward the windshield, a contact element, shown in the present instance as a roller, indicated as a whole by the numeral 45, is rotatably mounted on a shaft 46 carried by the inner section 21 at a point below and to the rear of the pin 23, as clearly shown in Figs. 1, 2 and 5, and mounted on the intermediate section 22 is a leaf spring 47 having recesses 48 formed in its opposite edge portions adjacent one end thereof adapted to receive, respectively, a plurality of lugs 49 formed on the intermediate section 22 and adapted to be bent inwardly as clearly shown in Figs. 3 and 6 for securing the spring 47 to the intermediate section 22, the opposite end of the spring 47 being extended upwardly into engagement with the contact element or roller 45 and provided adjacent its free end with a ridge 51 adapted to engage an annular groove 52 formed in the roller 45 for maintaining the spring in proper alignment and in engagement with the roller.

For varying the tension of the spring 47, a slide or yoke, indicated as a whole by the numeral 53, is provided with an opening 54 adapted to receive the intermediate section 22 and spring 47 in a manner to slide thereon, and with a plurality of recesses 55 communicating with said opening for receiving the lugs 49 in assembling the yoke 53 and intermediate arm section 22 when the lugs are in upstanding position and before being bent inwardly as shown in Figs. 3 and 6 for securing the spring 47 to the intermediate section 22, the yoke 53 being provided also with an intermediate portion 56 adapted to engage the spring 47, the innermost pair of the bent down lugs 49 serving to secure the yoke 53 against accidental displacement with respect to the arm.

It will be observed by such an arrangement that the tension of the spring 47 may be varied by moving the yoke 53 into various positions longitudinally thereof, the intermediate section 22 being provided with a pair of protuberances or projections 57 at opposite sides thereof for limiting the movement of the yoke.

By reference to Figs. 2 and 5, particularly Fig. 2, it will be apparent that when the free end of the spring 47 is in engagement with the contact element or roller 45, at one side of a line, indicated by the characters A—B extending through the pivotal center 23 of the arm and the axis of rotation 46 of the roller 45, that the tension of the spring 47 acts to yieldingly urge the intermediate section 22 and outer section 24 of the arm toward the windshield, and by reference to Fig. 5, it will be apparent that when the free end of the spring 47 is in engagement with the contact element or roller 45 on the opposite side of the line A—B, the tension of the spring 47 will act to urge the sections 22 and 24 in the opposite direction and to maintain the pivoted portions of the arm in adjusted position away from the windshield as illustrated in Fig. 5.

It is well known that in the operation of windshield wipers of the character described, the wiper blade, such as 28, changes its position and flops from one side to another at the extreme ends of its wiping movements or, in other words, when the direction of movement changes, thereby causing an outward movement of the free end of the arm section 24 away from the surface of the windshield. By positioning the contact element or roller 45 below the pivotal center 23 as shown in the present drawings, such movement will tend to increase the effective length of the spring 47, thereby reducing the effective pressure of the spring 47, thus it will be apparent that by placing the roller 45 lower than the pivot pin 23 on which the intermediate section 22 is hingedly connected to the inner section 21, the present arrangement provides not only a definite method of parking the arm away from the windshield, but the action is such that as the intermediate section 22 assumes different angles with relation to the inner section 21 due to outward movement of the free end of the arm section 24 caused by the flopping of the blade from one side to another, the effective length of the spring varies to avoid excessive pressure during the flopping movement of the blade.

Referring particularly to Figs. 5, and 10 to 13, inclusive, it will be apparent that a pair of arms 19 and 19a may be connected together to operate in unison as illustrated in Fig. 10, the arm 19 being connected to the actuating member 16 as clearly shown in Figs. 1, 2 and 3, and the arm 19a being secured to a sleeve 58 rotatably mounted on a pin or stud 59 carried by the windshield frame. The connecting member, indicated as a whole by the numeral 60, in the present instance, comprises a pair of aligned bars 61 and 62 having brackets 63 and 64 pivotally mounted adjacent their respective outer ends by means of pivot pins 65, the brackets 63 and 64 being provided with apertured lugs 66 adapted to straddle the inner sections 21 of the arms 19 and 19a adjacent the recesses 33 formed at the opposite side of the inner sections and are adapted to be secured thereto by means of bolts 67 extending therethrough and through the hollow rivet 32 mounted in the inner sections 21 of the arms, the brackets 63 and 64 being provided with a flange portion 67a adapted to be positioned between the side portions 31 of the inner sections 21 to assist in maintaining the bracket in alignment therewith.

The connecting member 60 also comprises an elongated substantially U-shaped channel member 68 having an elongated recess 68a (Fig. 13) formed in the bottom and extending longitudinally of the channel member and terminating inwardly from the opposite ends thereof as clearly shown in Figs. 10 and 11, the member 68 also having inwardly extending edge portions 69 adapted to slidably receive the inner ends of the bars 61 and 62 in a manner to maintain the bars in substantial alignment with each other. For positioning and securing the U-shaped channel member and the bars 61 and 62 in various positions of longitudinal adjustment with respect to each other, a pair of apertured plates 71 are positioned outside the inwardly extending edge portions 69 and a plurality of screw-threaded bolts 72 extend through the apertures in the plates 71 into threaded engagement with screw-threaded apertures 73 formed in the bars 61 and 62 for clamping the inwardly extending edge portions 69 between the bars and the plates 71 for securing the bars and channel member 68 in various positions of longitudinal adjustment and to provide an efficient connection between the arms 19 and 19a when positioned at various distances from each other, the ends of the bolts 72 extending into the elongated recess 68a, as clearly shown in Fig. 13, in a manner to engage the opposite ends of the recess to prevent complete separation of the bars 61 and 62 from the member 68 in the event that the bolts 72 are slightly loosened to permit relative longitudinal sliding movement of the member 68 and the bars 61 and 62.

For limiting the throw of the arms 19 and 19a in their wiping movement, a stop member 74 formed, preferably, of resilient material, such as rubber or the like, is provided with a stud 75 (Fig. 5) having an aperture 76 formed therein adapted to receive one or the other of the bars 61 or 62 (Figs. 10 and 11) illustrating the stop as mounted on the bar 61, and also in Fig. 5, inasmuch as the sectioned portion of Fig. 5 is shown as taken on the line 5—5 of Fig. 10, and for securing the stop member in various positions of adjustment with respect to the bar 61, a screw 77 is mounted in a threaded aperture 78 formed in the stud 75 and extending therethrough into engagement with the bar 61 as clearly illustrated in Fig. 5.

Although the stop member 74, as shown in Figs. 10 and 11, is positioned to be engaged by the arm 19a when the arms are moved in one direction, it will be observed that if desired, another stop member, similar to that indicated at 74, may be positioned on the bar 62 in a manner to be engaged by the arm 19 when the arms are moved in the opposite direction.

By such an arrangement, it will be apparent that a pair of arms of substantially uniform construction may be mounted on a windshield frame as desired and connected together to operate in unison by means of the connecting member 60 having the brackets 63 and 64 secured thereto and which are adapted to be readily and conveniently mounted on the inner sections of the arms 19 and 19a.

Obviously, the present invention is not limited to the precise construction and arrangement shown and described as the same may be variously modified. Moreover, all the features of the invention need not be used conjointly as the same may be used to advantage in variously different combinations and subcombinations.

What I claim as new and desire to secure by Letters Patent is:

1. In a device of the class described, the combination with an actuating member operatively related to a windshield, of an arm mounted on said member and comprising an inner section and a second section, said inner section having a contact element rotatably mounted thereon and having one of its end portions rigidly secured to said actuating member, said contact element having an annular groove formed therein, said second section comprising a member having one of its ends pivotally mounted on said inner section adjacent one end thereof between said contact element and the opposite end of the inner section for movement in a plane substantially perpendicular to the windshield, a leaf spring secured adjacent one of its ends to said second section and having an elongated ridged portion adjacent its opposite end engaging the annular groove in said rotatable contact element for retaining the ridged portion of the spring against relative displacement laterally with respect to the contact element.

2. In a windshield wiper arm, the combination of an inner section and a second section, said inner section comprising a member adapted to be secured to the actuating member of a windshield wiper mechanism and having a rotatable contact element mounted adjacent its free end, said contact element having an annular groove formed therein, said second section comprising a transversely elongated U-shaped member having one of its ends pivotally mounted on said inner section at a point intermediate said contact element and the other end thereof for movement in a plane substantially perpendicular to a windshield, and a leaf spring secured to said second section adjacent the free end thereof on the open side of said U-shaped structure, said leaf spring extending along said second section to said contact element of said inner section, and being provided with a portion formed to cooperate with said annular groove to retain said spring against relative displacement laterally with respect to said contact element.

CARL BRAMMING.